United States Patent [19]

Schuster et al.

[11] Patent Number: 5,008,229

[45] Date of Patent: Apr. 16, 1991

[54] COMPOSITIONS CONTAINING PHOSPHONITRILE CHLORIDES

[75] Inventors: Johann Schuster, Emmerting; Martin Piehler, Mehring; Horst Müller, Emmerting; Otto Schneider, Burghausen, all of Fed. Rep. of Germany

[73] Assignee: Wacker-Chemie GmbH, Munich, Fed. Rep. of Germany

[21] Appl. No.: 447,325

[22] Filed: Dec. 7, 1989

[30] Foreign Application Priority Data

Feb. 2, 1989 [DE] Fed. Rep. of Germany ....... 3903137

[51] Int. Cl.$^5$ .............................................. B01J 31/18
[52] U.S. Cl. .................................... 502/167; 502/150; 502/170; 502/200; 556/465
[58] Field of Search ................ 502/200, 167, 150, 170

[56] References Cited

U.S. PATENT DOCUMENTS

| | | | |
|---|---|---|---|
| 3,398,176 | 8/1968 | Nitzsche et al. | 556/401 |
| 3,652,711 | 3/1972 | Triem et al. | 525/477 |
| 3,839,388 | 10/1974 | Nitzsche et al. | 556/450 |
| 4,460,726 | 7/1984 | Huber et al. | 556/401 |
| 4,564,693 | 1/1986 | Riederer | 556/401 |
| 4,701,490 | 10/1987 | Burkhardt | 556/401 |
| 4,855,472 | 8/1989 | Burkhardt | 556/453 |
| 4,888,405 | 12/1989 | Gamon et al. | 556/462 |

FOREIGN PATENT DOCUMENTS 50-43097 4/1975 Japan .

Primary Examiner—Patrick P. Garvin
Assistant Examiner—E. D. Irzinski

[57] ABSTRACT

The present invention relates to compositions containing phosphonitrile chlorides and/or compositions thereof containing reaction products which accelerate the condensation and/or equilibration of organo(poly)siloxanes, halogen-free organic solvents and solubilizers and the use of such compositions in the condensation and/or equilibration of organo(poly)siloxanes.

8 Claims, No Drawings

COMPOSITIONS CONTAINING PHOSPHONITRILE CHLORIDES

The present invention relates to phosphonitrile chlorides and/or compositions thereof containing reaction products which accelerate the condensation and/or equilibration of organo(poly)siloxanes.

Background of the Invention

Solutions of phosphonitrile chlorides in dichloromethane and their use in the condensation and/or equilibration of organo(poly)siloxanes are described in, for example, U.S. Pat. No. 4,564,693 to Riederer et al. U.S. Pat. No. 3,652,711 to Triem et al discloses that benzene, toluene, petroleum ethers, halogenated hydrocarbons, ethers and ketones are suitable as solvents for phosphonitrile chlorides. JP-A-50-43,097 (laid open on 18th April 1975) describes the preparation of phosphonitrile chlorides in tetrachloroethane as a solvent in the presence of 2-ethylhexyl sulfosuccinate.

While the solubility of phosphonitrile chlorides in benzene, toluene, petroleum ethers and ethers is very low, phosphonitrile chlorides react with ketones giving a brown coloration.

OBJECT OF THE INVENTION

Therefore, it is an object of the present invention to prepare compositions of phosphonitrile chlorides and/or their reaction products with organopolysiloxanes which accelerate the condensation and/or equilibration of organo(poly)siloxanes, which are free of halogenated hydrocarbons. Another object of the present invention is to prepare phosphonitrile chlorides and/or their liquid compositions containing reaction products which accelerate the condensation and/or equilibration of organo(poly)siloxanes which are clear and in which the phosphonitrile chlorides are essentially stable to hydrolysis.

SUMMARY OF THE INVENTION

The foregoing objects and others which will become apparent from the following description are achieved in accordance with this invention, generally speaking, by providing a composition containing phosphonitrile chlorides and/or thereof containing thereof containing reaction products of phosphonitrile chlorides and organosiloxanes which accelerate the condensation and/or equilibration of organosiloxanes, halogen-free organic solvents and solubilizers.

DESCRIPTION OF THE INVENTION

In the description, phosphonitrile chlorides are understood to mean phosphonitrile chlorides per se and the reaction products of phosphonitrile chlorides with organo(poly)siloxanes which accelerate the condensation and/or equilibration of organo(poly)siloxanes. The term organosiloxanes as used herein also includes organopolysiloxanes.

The term organic solvents as used herein includes mixtures of organic solvents as well as solvent mixtures. Preferred organic solvents are those which do not react with phosphonitrile chlorides or reduce their action in accelerating the condensation and/or equilibration. The term solvent, as used herein, refers to an organic solvent in each case. Solvents or solvent mixtures having a boiling point or boiling range of up to 160° C., in particular up to 120° C., in each case at 0.1 MPa (abs.) are preferred.

Examples of solvents are alcohols, such as methanol, ethanol, n-propanol, iso-propanol; ethers, such as dioxane, tetrahydrofuran, diethyl ether, diethylene glycol dimethyl ether; esters, such as methyl acetate, ethyl acetate, n- and iso-propyl acetate, butyl acetate, diethyl carbonate and ethyl formate; hydrocarbons, such as pentane, n-hexane, mixtures of hexane-isomers, cyclohexane, heptane, octane, petroleum ether, benzene, toluene, xylenes; keytones, such as acetone, methyl ethyl ketone, methyl isobutyl ketone; carbon disulfide, acetonitrile, dimethylformamide or mixtures of these solvents.

The less preferred solvents include the abovementioned alcohols, ketones, dimethylformamide, carbon disulfide and acetonitrile.

$C_1$- to $C_3$-alkyl acetate, especially ethyl acetate, is preferred as a solvent in particular because of its low toxicity and its easy availability. Surprisingly, ethyl acetate is essentially stable in the compositions of this invention to the expected ester hydrolysis which is catalyzed by phosphonitrile chloride.

All solubilizers are suitable as solubilizers and thus as a constituent of the compositions of this invention which heretofore have been used as solubilizers for polar substances in a continuous, relatively less polar liquid medium. Solubilizers of this type are, inter alia, crown ethers, and $\alpha$-, $\beta$- and $\gamma$-cyclodextrins. Preferred solubilizers are surfactants, in particular cationic, anionic and non-ionic surfactants. Surfactants are employed per se in order to mix small amounts of a water-insoluble compound with an aqueous phase. However, the use of surfactants in organic phases to dissolve polar substances is unusual.

Examples of suitable surfactants are particularly (A) Non-ionic surfactants, such as
(1) Oxalkylates, i.e., reaction products of ethylene oxide and/or propylene oxide with
   (a) linear and branched, primary and secondary alcohols having 12 to 18 carbon atoms,
   (b) alkyl phenols, whose alkyl chains have up to 14 carbon atoms;
   (c) fatty acids having up to 24 carbon atoms;
   (d) fatty acid ethanolamides, fatty acid glycerol esters and fatty amines, whose alkyl group in each case has up to 24 carbon atoms;
(2) Esters of fatty acids in each case having up to 24 carbon atoms with polyhydroxy compounds, such as, with glycerol, diglycerol, polyglycerol, erythritol, pentaerythritol, xylitol, sorbitol, mannitol and sucrose;

(B) Cationic surfactants, in particular
(3) Quaternary ammonium compounds in which the nitrogen atom of the ammonium group is bonded to alkyl, alkaryl, alkylenehydroxy, alkylenealkoxy and alkyleneamino groups having in each case up to 24 carbon atoms;
(4) Imidazolinium salts which carry alkyl, aralkyl and/or alkylenehydroxy groups having up to 24 carbon atoms on carbon and/or N atoms and whose anion is halide, sulfate, phosphate or acetate;

(C) Anionic surfactants, such as
(5) Carboxylates, especially alkali or ammonium salts of fatty acids having up to 24 carbon atoms, their (poly)oxyalkylene esters, in which the alkyleneoxy units are ethyleneoxy and/or propyleneoxy units, their amides with sarcosinic acid and/or oligopeptides;

(6) Sulfonates, especially alkylbenzene sulfonates, alkylnaphthalene sulfonates, alkane sulfonates, olefin sulfonates, α-sulfofatty acid esters, sulfosuccinic acid alkyl esters, and alkoxy, acyloxy or acylaminoalkane sulfonates, whose carbon chain in each case has up to 30 carbon atoms;

(7) Sulfates, especially primary and secondary alkyl sulfates and salts of the sulfuric acid hemiesters of alkyl or alkylaryl oligoglycol ethers, whose alkyl chain has in each case up to 24 carbon atoms;

(8) Phosphonates and phosphates, especially alkali metal and/or ammonium salts of these compounds which have alkyl and/or alkaryl groups having up to 24 carbon atoms;

(D) Amphoteric surfactants, such as (9) Aminocarboxylic acids having up to 18 carbon atoms, especially the β-aminocarboxylic acids;

(E) Surfactants with heteroatoms in the hydrophobic radical, such as

(10) Liquid, pasty or wax-like block copolymers of propylene oxide and ethylene oxide, especially those having molecular weights of 1,000 to 5,000 g/mol;

(11) Silicon surfactants, such as polymethylsiloxanes having ethyleneoxy, propyleneoxy, alkoxy and ammonium groups;

(12) Fluorine surfactants, such as fluoroalkane carboxylic acids, such as perfluoroalkane carboxylic acids and fluoroalkane sulfonic acids, especially perfluoroalkane carboxylic acids, in which the alkyl radical of the acids has in each case up to 24 carbon atoms.

Particularly preferred solubilizers are the surfactants mentioned above under (B)(3) and (C)(6), in particular alkali metal or ammonium ($C_6$- to $C_{24}$-)alkylsulfate and/or ($C_6$- to $C_{24}$-)alkylammonium halide or the corresponding acids of the alkali metal or ammonium salts mentioned, especially sodium dodecyl sulfate an ammonium dodecyl sulfate or dodecyl sulfonic acid.

Surprisingly, the presence of low amounts of water in the compositions of this invention are not harmful. Thus, for example, aqueous solutions of surfactants may be employed in the preparation of the compositions of this invention. The halogen-free solvents, which are used in the preparation of the compositions of this invention, may likewise also contain small amounts of water. Such small amounts of water are even preferably present in the preparation of the compositions of this invention. The amount of water may range from about 0.1 percent by weight to about 5 percent by weight, and more preferably from 0.5 percent by weight to 4 percent by weight, based on the total weight of the compositions of this invention.

The phosphonitrile chlorides which are contained in the compositions of this invention, as such or in the form of their reaction products, are compounds which are essentially synthesized from phosphorus, nitrogen and chlorine atoms. These are the compounds designated as phosphorus nitride dichloride, phosphorus nitride chloride and phosphonitrile chloride. These compounds are represented, for example, by the formulas $(PNCl_2)_x$, $Cl_3PNPCl_2NPCl_3PCl_6$ and $Cl_3PNPCl_3PCl_6$.

Preferably, the compositions of this invention contain phosphonitrile chlorides and, to be more specific, those which are prepared by reaction of phosphorus pentachloride with ammonium chloride. In particular, these phosphonitrile chlorides are obtained by reacting 400 parts by weight of phosphorus pentachloride with 130 parts by weight of ammonium chloride (according to Berichte der deutschen chemischen Gesellschaft, 57th year, 1924, page 1345) and/or by reaction of two moles of phosphorus pentachloride with one mole of ammonium chloride (according to U.S. Pat. No. 3,839,388). The latter mentioned phosphonitrile chlorides are preferred.

One type of phosphonitrile chloride, and also a mixture of at least two phosphonitrile chlorides can be employed.

Preferably, the compositions of this invention contain, (a) from 0.01 percent to 80 percent, preferably from 0.05 percent to 50 percent, and more preferably from 0.1 percent to 30 percent by weight of phosphonitrile chloride(s);

(b) from 0.01 percent to 20 percent, preferably from 0.1 percent to 10 percent, and more preferably from 0.3 percent to 5 percent by weight of solubilizer(s); and (c) at least 15 percent, preferably at least 50 percent, and more preferably from 70 percent to 99.8 percent by weight of solvent(s), based on the total weight of phosphonitrile chloride (a), solubilizer (b), and solvent (c).

In general, an amount of from 0.1 percent by weight to 4 percent by weight of solubilizer, based on the weight of phosphonitrile chloride employed, is sufficient. A higher amount of surfactant is possible, but provides no additional advantages. The amount of solvent can be relatively low if the composition is intended to be stored as a concentrate and is then further diluted before use.

The organic solvent used in the compositions of this invention preferably consists of at least 90 percent, and more preferably at least 95 percent, based on its weight of halogen-free organic solvent. The organic solvent used in the compositions of this invention is free from halogen-containing organic solvents except for impurities which may be present in its preparation. Halogen-containing organic solvents which may be present in the compositions of this invention and only to a small extent or not at all are all solvents which contain both carbon atoms and halogen atoms, such as, for example, tetrachloromethane.

In order to prepare the compositions of this invention, the components—phosphonitrile chloride(s), solubilizer and solvent—can be combined with one another in any sequence. For example, the solubilizer, i.e., preferably surfactant(s) and then the solid phosphonitrile chloride can be added to the solvent (mixture). Phosphonitrile chloride crystals can also be mixed with solvent and this mixture can then be added to the solubilizer. Preferably, the solubilizer and solvent are first mixed with one another and phosphonitrile chloride is then added to this mixture. Preferably, the solubilizer is added in the form of an aqueous solution.

The compositions of this invention are clear; therefore, it is assumed that they are solutions or microdispersions.

Compared to the known solutions of phosphonitrile chlorides in halogenated hydrocarbons, the compositions of this invention have a substantially increased stability to hydrolysis of the phosphonitrile chloride.

The compositions of this invention are especially suitable as catalyst components for the condensation and/or equilibration of organo(poly)siloxanes. Any organo(poly)siloxanes containing Si-bonded hydroxyl groups which could have been employed in the previously known processes for condensing and/or equilibrating organo(poly)siloxanes with Si-bonded hydroxyl groups in the presence of a phosphorus, nitrogen and chlorine-containing catalyst can also be employed as organo(poly)siloxanes in the process of this invention.

Examples of such organo(poly)siloxanes containing Si-bonded hydroxyl groups are, in particular, those of the formula $$HO(SiR_2O)_nH$$

in which R represents the same or different, monovalent, SiC-bonded organic radicals or hydrogen, with the proviso that a monovalent, SiC-bonded organic radical is also bonded to any silicon atom to which hydrogen is directly bonded, and n is an integer having a value of at least 1, and more preferably at least 2.

Although these are not shown by the above formulas, up to a total of 5 mol percent of units of the formula $SiR_2O$ can be replaced by other siloxane units, but these are generally only present as impurities which can be avoided only with difficulty. Examples of other siloxane units which can be present generally as impurities are those of the formulas $RSiO_{3/2}$ or $R_3SiO_{\frac{1}{2}}$, where R is the same as above, or $SiO_{4/2}$ units or mixtures of at least two such siloxane units.

A single type of organo(poly)siloxane having Si-bonded hydroxyl groups can be employed in the process of this invention or mixtures containing at least two different types of such organo(poly)siloxanes can be employed.

Cyclic organo(poly)siloxanes, especially those of the formula $$(R_2SiO)_m$$

in which R is the same as above and m is an integer with a value of from 3 to 12, preferably from 4 to 8, and more preferably 4, can also be employed in the process of this invention either alone or in admixture with organo(poly)siloxanes containing Si-bonded hydroxyl groups. Preferably, the SiC-bonded organic radicals in the organo(poly)siloxanes employed in the process of this invention and thus the organic radicals represented by R in the above formulas contain up to 18 carbon atoms per radical. Examples of radicals of this type are hydrocarbon radicals, such as alkyl radicals, for example the methyl, ethyl, n-propyl, iso-propyl, n-butyl and sec-butyl radicals and also octadecyl radicals; hydrocarbon radicals containing aliphatic multiple bonds, for example, the vinyl and allyl radicals; aryl radicals, for example the phenyl radical and xenyl radicals; alkaryl radicals, for example tolyl radicals; and aralkyl radicals, for example the benzyl radical. These hydrocarbon radicals may have substituents which are inert to water and the catalyst used according to this invention under the reaction conditions. Other examples of monovalent, SiC-bonded organic radicals in the organo(poly)siloxanes employed in the process of this invention and thus also of organic radicals represented by R in the above formulas are therefore halogenated monovalent hydrocarbon radicals, such as halogenoalkyl radicals, for example the 3,3,3-trifluoropropyl radical, and halogenoaryl radicals, for example the o-, p- or m-chlorophenyl radical; monovalent aliphatic radicals containing carbon, hydrogen, ether oxygen and fluorine atom(s), for example the 1,1,2,2,3,3-hexafluoropropyloxypropyl radical and the 1,1,2,2-tetrafluoroethoxypropyl radical, and acyloxyalkyl radicals, such as the gamma-acryloxypropyl radical and gamma-methacryloxypropyl radical.

However, because of their availability, it is preferred that at least 80 percent of the number of organic radicals in the organo(poly)siloxanes employed in the process of this invention and thus also the organic radicals represented by R in the above formulas be methyl radicals.

The condensation and/or equilibration of the organo(poly)siloxanes is preferably carried out at 100° to 200° C.

In order to facilitate the removal of the water formed in the condensation, the condensation and/or equilibration of the organo(poly)siloxanes is preferably carried out at a pressure below 800 hPa (abs.). However, the condensation, but in particular the equilibration, can also be carried out at higher pressures.

After the condensation and/or equilibration of the organo(poly)siloxanes, the catalyst used according to this invention or a reaction product which has been formed from this catalyst by reaction with an organo(poly)siloxane to be condensed and/or to be equilibrated, which promotes the condensation and/or equilibration of organo(poly)siloxanes, can be deactivated by the addition of, for example, triisononylamine, n-butyllithium or hexamethyldisilazane in order to stabilize the organopolysiloxanes obtained in the process of this invention to viscosity changes.

The linear organopolysiloxanes prepared according to this invention can be used for all purposes in which the linear organopolysiloxanes prepared by previously known processes by condensing and/or equilibrating organo(poly)siloxanes were also able to be employed. These organo(poly)siloxanes can, for example, be employed as filament lubricants, in the preparation of organopolysiloxane elastomers, where the cross-linking can take place by condensation, addition of Si-bonded hydrogen to, for example, SiC-bonded vinyl groups or by radical formation, depending on the type of the terminal units of the linear organopolysiloxanes, and in the production of coatings containing adhesive substances.

In the processes described above, the compositions of this invention are preferably employed in such an amount that the phosphonitrile chloride is present in an amount of from 1 ppm to 1000 ppm, and more preferably from 2 ppm to 200 ppm, based on the total weight of the organo(poly)siloxanes.

In the following examples,
(a) all amounts are based on weight;
(b) all pressures are 0.10 MPa (abs.); and
(c) all temperatures are 20° C., unless otherwise specified.

EXAMPLES (A) Preparation of phosphonitrile chloride

Phosphonitrile chloride was prepared according to U.S. Pat. No. 3,839,388 to Nitzsche et al, by reacting 2 mols of phosphorus pentachloride with one mol of ammonium chloride until the evolution of hydrogen chloride ceased.

(B) Preparation of the compositions of this invention
(1). Concentrates
(1.1) About 2.9 g of ammonium lauryl sulfate as a 35 percent by weight aqueous solution were added with stirring to 600 ml of ethyl acetate in a flask fitted with a stirrer, and 72 g of solid, finely crystalline phosphonitrile chloride prepared according to (A) above was then added to the mixture, which was stirred at room temperature for about one-half hour. The resultant solution was then filtered.

(1.2) The procedure described in (1.1) above was repeated, except that the solvent was first added with stirring to the crystal magma produced in the preparation of the phosphonitrile chloride and the surfactant was then added. After subsequently stirring from 5 to 30 minutes, depending on the rate of stirring, a clear active solution was obtained after filtration.

(2) Ready-to-use solutions

For direct use in industrial processes, the concentrates prepared according to (1.1) and (1.2) above, were diluted to a phosphonitrile chloride concentration of from 0.2 to 3 percent by weight with ethyl acetate or $\alpha,\omega$-bistrimethylsiloxypolydimethylsiloxane.

(C). Examples which use the compositions of this invention.

(1) Condensation

About 1,500 kg/h of $\alpha,\omega$-dihydroxypolydimethylsiloxane having a viscosity of about 120 mPa.s at 23° C. and 1,000 ml/h was continuously metered into 0.45 percent by weight solution of phosphonitrile chloride in ethyl acetate, which contained 0.018 percent by weight of ammonium lauryl sulfate, in a screw reactor. The reaction temperature was 160° C. and the pressure was 6 kPa. After an average residence time of about 2 minutes, the catalyst was deactivated by the continuous addition of 35 ml/h of triisononylamine. An $\alpha,\omega$-bis-hydroxypolydimethylsiloxane having a viscosity of 350,000 mPa.s at 23° C. was obtained. The polymer prepared in this manner was clear and odorless.

(2) Equilibration

About 600 kg/h of an $\alpha,\omega$-dihydroxypolydimethylsiloxane having a viscosity of about 120 mPa.s at 25° C. 600 ml/h of a 2.5 percent by weight catalyst solution containing phosphonitrile chloride and 0.1 percent by weight of ammonium lauryl sulfate in ethyl acetate, and 80 kg/h of an $\alpha,\omega$-bisvinyldimethylsiloxypolydimethylsiloxane having a viscosity of 180 mPa.s at 23° C. were continuously fed into a screw mixer. The reaction temperature was 160° C. and the pressure was less than 5 hPa. After a residence time of about 3 minutes, the catalyst was deactivated by the continuous addition of 600 ml/h of 1,1'-divinyl-1,1,1',1'-tetramethyldisilazane. An $\alpha,\omega$-bis-vinyldimethylsiloxypolydimethylsiloxane having a viscosity of about 20,000 mPa.s at 23° C. was obtained.

(3) Batchwise preparation of $\alpha,\omega$-bis-trimethylsiloxypolydimethylsiloxanes About 1,000 g of $\alpha,\omega$-dihydroxypolydimethylsiloxane having a viscosity of 120 mPa.s at 23° C. and 10.6 g of hexamethyldisiloxane were heated under reduced pressure to a temperature of from 80° to 100° C. with stirring in a flask fitted with a stirrer. Three portions of 0.2 ml each of catalyst solution (15 percent by weight of phosphonitrile chloride, 0.6 percent by weight of hexadecyltrimethylammonium chloride in ethyl acetate) were added to this mixture at intervals of 10 minutes. Thirty minutes after the last addition of catalyst, the mixture was deactivated using 10 ml of hexamethyldisilazane. An $\alpha,\omega$-bis-trimethylsiloxypolydimethylsiloxane having a viscosity of 1,000 mPa.s at 23° C. was obtained.

What is claimed is:

1. A composition which will accelerate the condensation and/or equilibration of organosiloxanes which comprises phosphonitrile chloride and/or reaction products of phosphonitrile chloride and organosiloxanes, a halogen-free organic solvent and a solubilizer.

2. The composition of claim 1, wherein the organic solvent is at least 90 percent by weight of halogen-free organic solvent.

3. The composition of claim 1, wherein the solubilizer is selected from the group consisting of a non-ionic, cationic and anionic surfactants.

4. The composition of claim 2, wherein the solubilizer is selected from the group consisting of a non-ionic, cationic and anionic surfactants.

5. The composition of claim 3, wherein the solubilizer is selected from the group consisting of an alkali metal ($C_6$- to $C_{24}$-)alkylsulfate and a ($C_6$-to $C_{24}$-) alkylammonium halide.

6. The composition of claim 4, wherein the solubilizer is selected from the group consisting of an alkali metal ($C_6$- to $C_{24}$-)alkylsulfate and a ($C_6$-to $C_{24}$-) alkylammonium halide.

7. A process for preparing the composition of claim 1, which comprises mixing a solubilizer with a halogen-free organic solvent to form a mixture and thereafter adding a phosphonitrile chloride and/or reaction products of phosphonitrile chloride and organosiloxanes to the resultant mixture.

8. The composition of claim 1, wherein the phosphonitrile chloride is present in an amount of from 0.01 to 80 percent by weight, the solubilizer is present in an amount of from 0.01 to 20 percent by weight and the halogen-free organic solvent is present in an amount of from 15 to 99.8 percent by weight based on the total weight of phosphonitrile chloride, solubilizer and solvent.

* * * * *